US007673796B2

(12) United States Patent
Kobres et al.

(10) Patent No.: US 7,673,796 B2

(45) Date of Patent: Mar. 9, 2010

(54) SYSTEM AND METHOD FOR PROVIDING REMOTE SITE INTERVENTION SUPPORT FOR SELF-CHECKOUT STATIONS

(75) Inventors: Erick Christian Kobres, Lawrenceville, GA (US); John Fredrick Crooks, Duluth, GA (US); David Taylor Baker, Cumming, GA (US)

(73) Assignee: NCR Corporation, Dayton, OH (US)

( * ) Notice: Subject to any disclaimer, the term of this patent is extended or adjusted under 35 U.S.C. 154(b) by 147 days.

(21) Appl. No.: 11/546,101

(22) Filed: Oct. 11, 2006

(65) Prior Publication Data

US 2008/0087724 A1 Apr. 17, 2008

(51) Int. Cl.
*G06K 15/00* (2006.01)

(52) U.S. Cl. ........................................ 235/383; 186/59

(58) Field of Classification Search ................ 235/383, 235/378; 186/59

See application file for complete search history.

(56) References Cited

U.S. PATENT DOCUMENTS

| | | | | |
|---|---|---|---|---|
| 5,083,638 | A * | 1/1992 | Schneider | 186/61 |
| 5,115,888 | A * | 5/1992 | Schneider | 186/61 |
| 5,579,000 | A * | 11/1996 | Mulqueen | 340/5.91 |
| 5,747,784 | A * | 5/1998 | Walter et al. | 235/383 |
| 7,044,370 | B2 | 5/2006 | Bellis, Jr. et al. | |
| 2005/0040230 | A1* | 2/2005 | Swartz et al. | 235/383 |

FOREIGN PATENT DOCUMENTS

| | | | |
|---|---|---|---|
| EP | 993191 | A2 * | 4/2000 |

* cited by examiner

*Primary Examiner*—Michael G Lee
*Assistant Examiner*—Rafferty Kelly
(74) *Attorney, Agent, or Firm*—Maginot, Moore & Beck LLP; Paul W. Martin

(57) ABSTRACT

A system and method enables intervention events occurring at a self-checkout station at a retail site to be addressed by an operator located at a remote site distant from the retail site. The system includes a checkout station located at a retail site, a video camera and microphone mounted at the checkout station, a data communicator for collecting video and audio data from the video camera and microphone and operational data from the checkout station, an intervention service station for receiving the video, audio, and operational data from the data communicator, the intervention service station being located off-site from the retail site; and the intervention service station includes a checkout station command generator for generating and sending checkout station commands to the checkout station in response to the operational data received from the data communicator so that an operator at the intervention service station can intervene in the checkout station operation.

20 Claims, 4 Drawing Sheets

SYSTEM AND METHOD FOR PROVIDING REMOTE SITE INTERVENTION SUPPORT FOR SELF-CHECKOUT STATIONS

TECHNICAL FIELD

This invention relates to self-checkout stations used in retail establishments and, more particularly, to self-checkout stations monitored by a remote attendant.

BACKGROUND

Self-checkout stations at grocery stores and other retail stores are well known. The stations permit a consumer to scan articles for purchase so the station may identify the articles and a corresponding price. When the consumer indicates all articles for purchase have been presented to the terminal, a sub-total is accumulated, any taxes and discounts are computed, and a total amount due is displayed for the consumer. The station then allows the consumer to select a payment method. The station presents menu selections to the consumer so funds may be transferred to the retailer's account. Upon confirmation of payment, the articles are released to the consumer.

A self-checkout station typically includes a terminal, a scanner/scale for reading unit price codes (UPC) and determining article weight, a cashier keypad and display, a POS terminal for payment entry, a receipt printer, a change unit, and a checkout area for holding articles once they have been scanned. The terminal also includes a display, a processor, memory, programmed instructions, and data peripherals to control the operations of the station. The programmed instructions may contain modules for querying for article prices, computing totals and performing other functions related to the purchase of articles through a self-checkout station. Some checkout stations may also include a security application program that uses data from sensors such as scales to reduce the likelihood that the consumer leaves without scanning all of the articles or exchanging scanned articles with more expensive articles that have not been scanned.

Typically, two or more self-checkout stations are located proximately to one another with a checkout attendant station nearby. The checkout attendant may help consumers who may be using a self-checkout station for the first time, who are having trouble with scanning an article, or who are having difficulty with a payment method or the like. That is, the primary duty of the attendant is to provide assistance to customers who are using the self-checkout stations so the stations efficiently and quickly process customers with their checkouts. Although these attendants are available to assist in security monitoring, such duties actually detract from the performance of their primary duty.

Issues regarding the effectiveness and efficiency of self-checkout station attendants have arisen since the introduction of self-checkout stations. For one, an attendant is capable of physically interacting with only one customer at a time. This limitation restricts the number of self-checkout stations that an attendant can effectively service without causing long waits and irritating customers. Attendants are also subject to other distractions that impact their availability for servicing self-checkout station customers. These distractions include conversations with other employees or customers not using the self-checkout stations. Additionally, periods in which all or most of the self-checkout stations are being used are especially demanding on the limited resources of an attendant physically present at the self-checkout station area.

While one response to these issues would be to increase the number of attendants available for self-checkout station service, that response would defeat the purpose of installing self-checkout stations, which is to reduce the need for cashiers. That response also adds expenses to the operation of the retail establishment as labor costs are some of the most expensive costs for a business. Even if additional personnel were added for anticipated peak periods, identifying the peak periods and scheduling the additional personnel for the peak periods alone would be a difficult task.

SUMMARY

To address the limitations arising from the provision of attendants at a self-checkout station area to service customers of self-checkout stations, a system and method are disclosed for off-site self-checkout station service. The system includes a checkout station located at a retail site, a video camera and microphone mounted at the checkout station, a data communicator for collecting video and audio data from the video camera and microphone and operational data from the checkout station, an intervention service station for receiving the video, audio, and operational data from the data communicator, the intervention service station being located off-site from the retail site; and the intervention service station includes a checkout station command generator for generating and sending checkout station commands to the checkout station in response to the operational data received from the data communicator so that an operator at the intervention service station can intervene in the checkout station operation.

A method that may be implemented by the system includes generating video, audio, and operational data at a checkout station located at a retail site, transmitting the video, audio, and operational data from the checkout station, receiving the video, audio, and operational data from the checkout station at an intervention service station that is located off-site from the retail site, and generating and sending checkout station commands to the checkout station in response to the operational data received from the data communicator so that an operator at the intervention service station can intervene in the checkout station operation.

Advantages and features of the present invention may be discerned from reviewing the accompanying drawings and the detailed description of the invention.

BRIEF DESCRIPTION OF THE DRAWINGS

The present invention may take form in various components and arrangement of components and in various methods. The drawings are only for purposes of illustrating exemplary embodiments and alternatives and are not to be construed as limiting the invention.

DETAILED DESCRIPTION OF THE INVENTION

Figure 1:
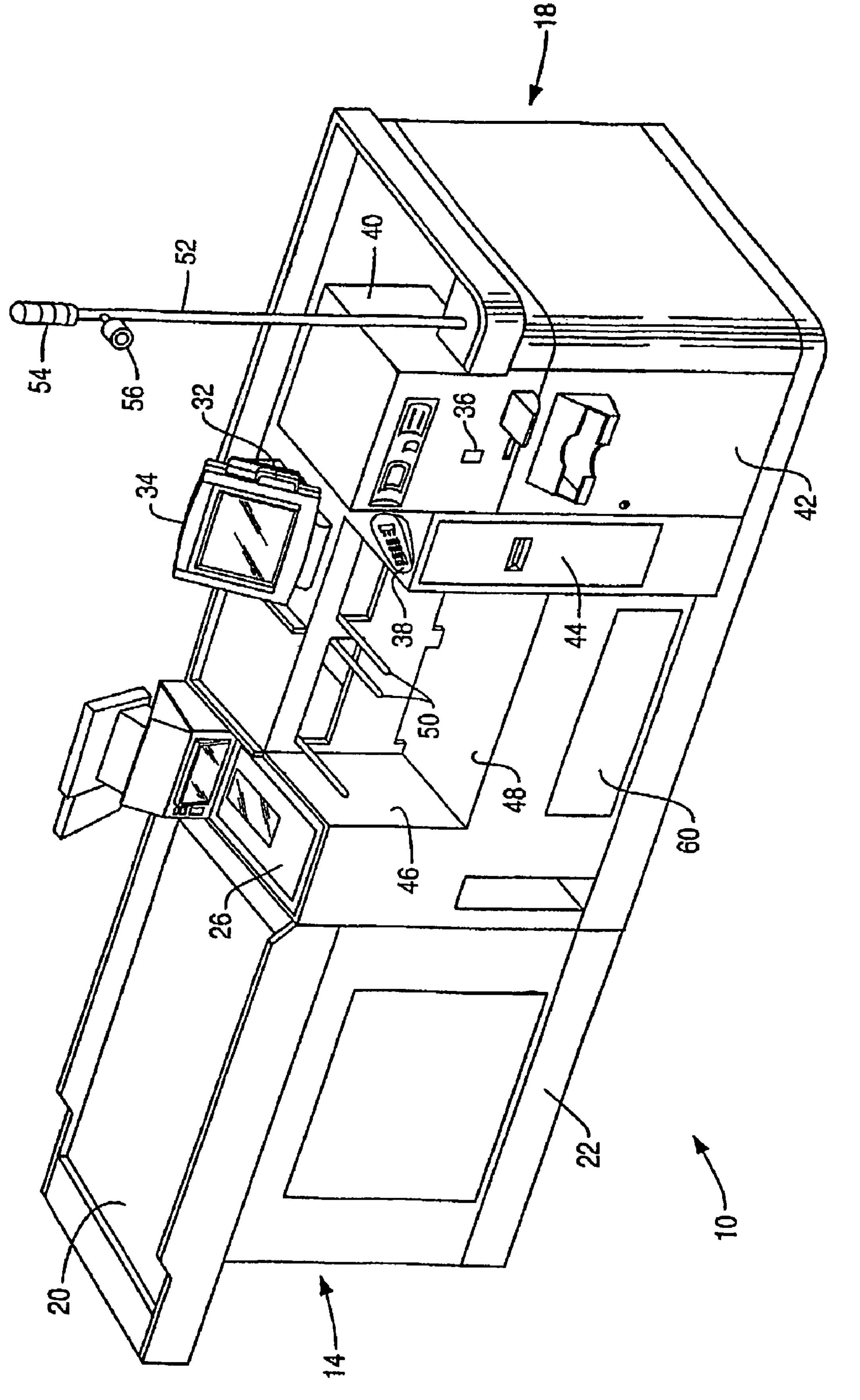
FIG. 1 depicts a perspective view of a self-checkout station having the ability to communicate with a remote intervention service station for resolution of an intervention event occurring at the self-checkout station.

A checkout station that may be modified in accordance with the principles of the present invention is shown in FIG. 1.

Checkout station 10 may include a feeder unit 14 and a checkstand 18. Feeder unit 14 includes a feeder belt 20 and housing 22 for the motor and control circuitry that operates feeder belt 20. Feeder unit 14 is movably coupled to checkstand 18 so the feeder belt may be aligned with scanner/scale unit 26. Checkstand 18 includes scanner/scale unit 26, consumer terminal 34, a payment terminal 38 for entry of payment data, and receipt printer 44. Scanner/scale unit 26 uses a laser shining on a glass or other transparent platen to input data from bar codes applied to products or packages. Unit 26 may also include a scale for measuring the weight of articles that are sold on a price/unit of weight basis. Consumer terminal 34 displays article data as it is entered through scanner/scale unit 26. Payment terminal 38 may be any known POS terminal that incorporates a card reader 32 to support credit card, debit card, and other payment methods. Receipt printer 44 provides a consumer with a receipt itemizing the articles purchased and the method of payment.

Receipt printer 44 and scanner/scale unit 26 may be separated by a bag well 46 having a security scale 48 for its floor. Bags for storing articles that consumers have scanned and weighed are hung from hanging rails 50 in bag well 46. Security scale 48 uses article weight data derived from scanner/scale 26 or a database using a scanned unit product code (UPC) to verify that only the articles scanned are placed on the security scale. Security application programs operating within terminal 34 monitor security scale 48 to determine whether articles not scanned have been added to the security scale area. An anomalous condition that requires investigation may be signaled by lighting a warning or alert light color within the tri-color indicator mounted at the terminal end of indicator pole 52 of checkstand 18. A security camera 56 may be mounted onto indicator pole 52 for generating video data corresponding to the checkstand area. A database, disk drive, or other computer peripheral required for station operation may be housed within peripheral tray 60 located within checkstand 18. Checkstand 18 also includes upper currency module 40 for receiving currency and coins from a consumer as payment for a transaction. Module 40 also includes a coin dispenser 36 that returns the coin portion of the consumer's change while lower currency module 42 returns the bill portion of the consumer's change. Module 40 may also include a cash recycling unit (not shown) to provide cash received from consumers in the change dispensed to consumers.

As shown in FIG. 1, a consumer may place articles on feeder belt 20 and belt 20 is driven to bring articles to the end of belt 20 where a shut-off mechanism stops belt 20. The consumer may then remove articles from belt 20 and move them, one at a time, over scanner/scale 26 for article product data retrieval and/or weighing. Alternatively, the consumer may pull a cart containing articles for purchase so it is adjacent feeder unit 22 and place articles from the cart onto scanner/scale 26. The scanned articles may then be placed in bags on security scale 48. Once all of the articles are scanned, a consumer may provide payment through payment terminal 38 or currency module 40, receive change from module 44, and a receipt from printer 44. The consumer may then remove the bags from security scale 48 and leave station 10. The operation of checkout station 10 is controlled by a processor that is typically incorporated within terminal 34.

Figure 2:
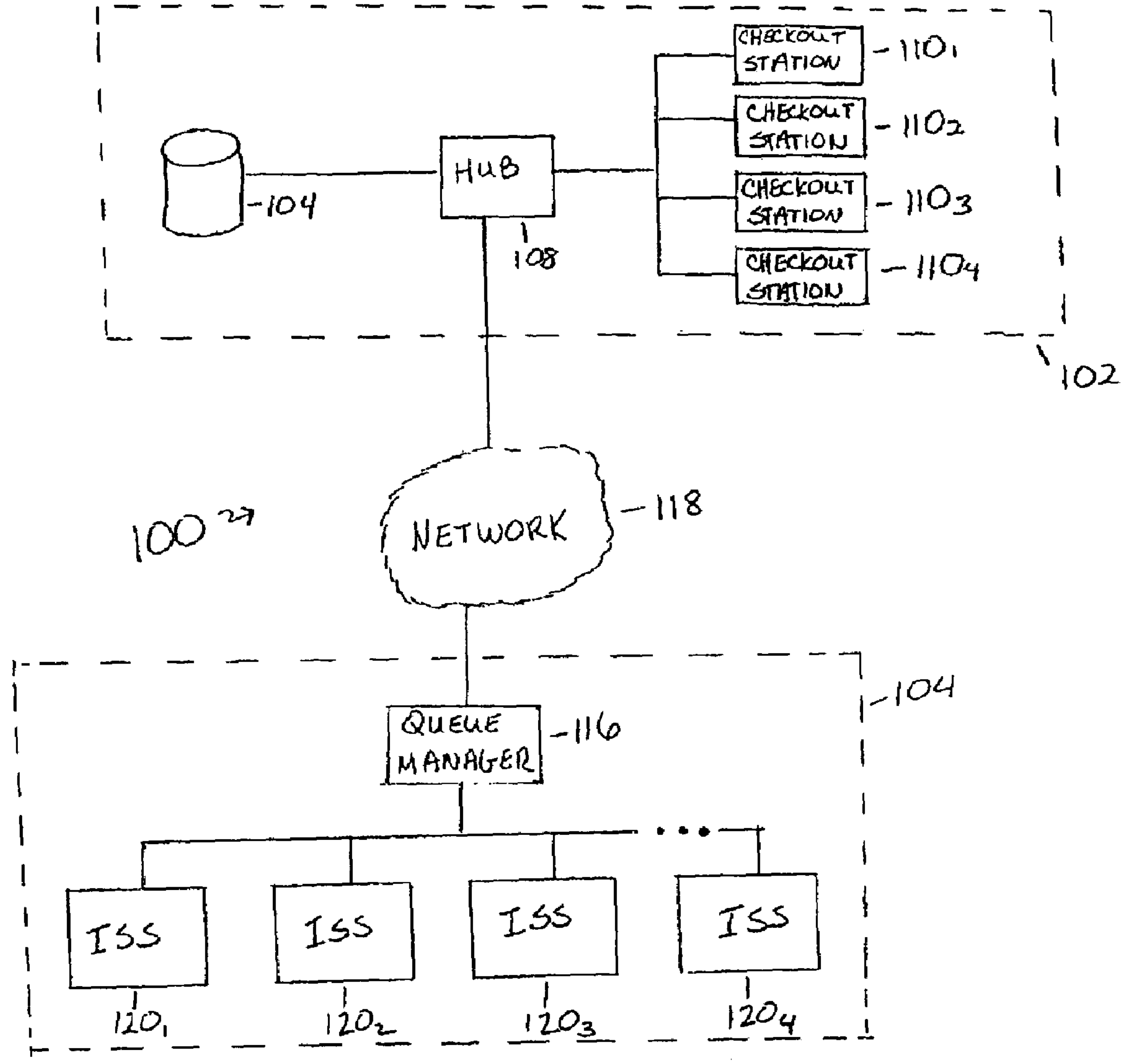
FIG. 2 is a block diagram of a system for remotely resolving intervention events occurring at the self-checkout station shown in FIG. 1.

A block diagram of a system for remotely intervening in the operation of self-checkout stations at a retail site is shown in FIG. 2. System 100 includes a plurality of self-checkout stations 1101, 1102, 1103, and 1104, such as the self-checkout station described above and shown in FIG. 1, that are located at a retail site 102. The number of self-checkout stations depicted in FIG. 2 that may be monitored for intervention events is exemplary only. System 100 also includes a server 104 that is coupled to self-checkout stations $\mathbf{110}_1$, $\mathbf{110}_2$, $\mathbf{110}_3$, and $\mathbf{110}_4$ through a network hub 108. Each self-checkout station includes an internal high speed data communication hub that communicates data between its associated self-checkout station and network hub 108.

Server 104 may be any computer with sufficient resources to act as a server to client applications executing in the components of a self-checkout station that may communicate with server 104 through the high speed data hub coupled to the self-checkout station. Server 104 preferably has at least a Pentium processor operating at 1.8 GHz with 128 MB of RAM and a 60 GB hard drive. The hard drive may be partitioned to allocate storage space for each of the self-checkout stations coupled to the server, although other data structures, such as folders and files, for example, may be used to store data corresponding to each checkout station. Alternatively, server 104 may be coupled to a database management system (not shown) for storing operational data received from the self-checkout stations and for querying the database that stores the product identification and pricing data for items sold in the store. Preferably, server 104 includes one or more hard drives. Each hard drive may correspond to one of the self-checkout stations coupled to the server as shown in FIG. 2. Hard drives are used to store data for the checkout station that corresponds to the drive. In this architecture, server 104 is coupled to a database management system (not shown) for database operations with the product identification and pricing database.

The processor of server 104 may act as a central processor for executing a self-checkout station control application image for each of the self-checkout stations. Server 104 may have a single self-checkout station control application that controls all of the self-checkout stations or it may execute an image of a self-checkout station control application for each of the self-checkout stations coupled to sever 104. Alternatively, each self-checkout station may have its own processor for executing a self-checkout station control application within the checkout station. The control application is a program that processes data for a checkout station and controls the checkout station operations.

Data generated by a self-checkout station is identified in accordance with the network protocol implemented in system 100. Preferably, the network protocol is the USB protocol implemented on an Ethernet 10BaseT backbone, although other protocols may be used to identify the source and recipient of data communicated over the network formed by server 104, network hub 108, and the self-checkout stations coupled to server 108. The self-checkout station control application processes data to generate self-checkout station commands and/or to store operational data in a data repository corresponding to the self-checkout station. The data repository may be coupled-to the server 104, in which case, self-checkout station component commands or operational data generated by the control application or control application image may be communicated through network hub 108. Network hub 108 may be a local area network (LAN) hub or wireless network hub. For example, network hub 108 may be a USB Over IP hub available from Digi, Inc. of Austin, Tex.

Network hub 108 and the high speed communication hubs within the self-checkout stations communicate at a rate of at least 12 Mbps. Preferably, the hubs within the self-checkout stations are USB 2.0 hubs that support communication in the range of 12 Mbps to 480 Mbps, such as the USB Anywhere hubs. In one embodiment, server 104 includes a USB 2.0 host controller that enables data communication between server 104 and hub 108 at the rate maintained between hub 108 and the high speed hubs in the self-checkout stations. Server 104 also includes an operating system, such as Windows 2000, Windows XP, NT 4.0, and a network communication stack, such as Inside Out Networks 4.0 USB stack. Alternatively, communication components implementing the 1394 Firewire specification may be used to provide high speed data communication between the server and the checkout stations. The high speed data communication between the server 104 and the self-checkout stations through the hub 108 enables communication at the on-site location 102 with negligible delay.

Figure 3:
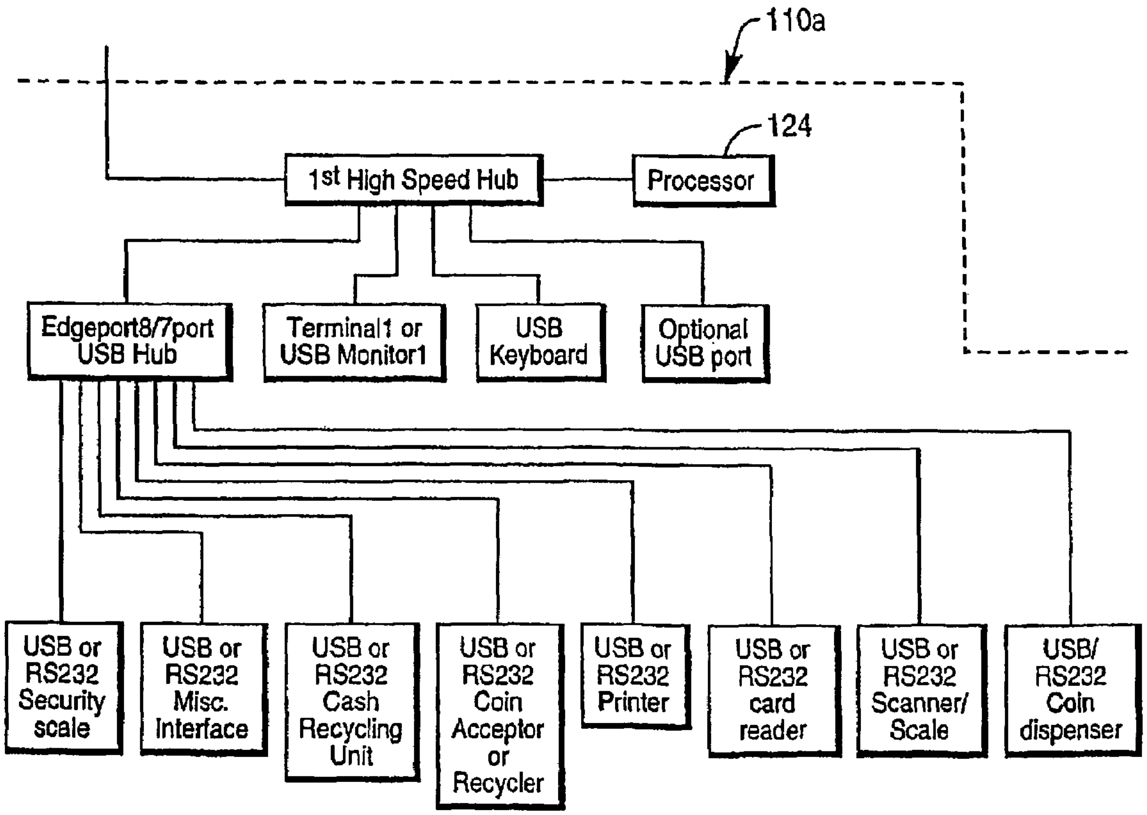
FIG. 3 is a block diagram of a self-checkout station that may communicate with a remote intervention service station.

A block diagram of one of the self-checkout stations 110 is shown in FIG. 3. Using like numerals for like components, self-checkout station 110 includes a USB 2.0 interface 130 to which a security scale 48, cash recycling unit 134, coin acceptor 40, printer 44, magnetic card reader 32, scanner/scale 26 and coin dispenser 36 are coupled. A USB or RS-232C interface 138 may also be provided to couple additional devices to a single port of interface 130. Interface 130 may be an Edgeport8/7port USB hub, for example. The components coupled to interface 130 may communicate in accordance with the RS-232C, USB 1.1, or USB 2.0 specification. Interface 130 multiplexes the communication from the components to the high speed data hub 112. The communication between a self-checkout station component and the hub 112 through interface 130 is performed at the rate supported by the component. For example, a coin acceptor that communicates in accordance with the RS-232C specification sends and receives messages at a rate supported by that specification while a component that communicates in accordance with the USB 1.1 specification sends and receives messages at the rate supported by that specification. Once messages reach high speed hub 108, they may be transmitted at the higher data rate to the central processor through network hub 108 and messages for a self-checkout component are provided at the higher data rate until they reach hub 112 for internal communication within a checkout station 110. Likewise, communication between hub 112 and one of the checkout station components coupled to hub 112, such as monitor 34, keyboard 38 or an optional USB device 140 or a device coupled to a USB port 144, remains at the rate of the component.

As shown in FIG. 2, the self-checkout stations at the retail site 102 may communicate through a network 118 with one of the intervention service stations $\mathbf{120}_1$, $\mathbf{120}_2$, $\mathbf{120}_3$, and $\mathbf{120}_n$, which are located at a site 114 that is remote from the self-checkout stations. The operational data communicated with an intervention service station 120 include operational data generated by the components of a self-checkout station, such as those shown in FIG. 3. Additionally, the security camera 56 generates video data of the checkstand area, which is where a consumer stands to operate a self-checkout station. A self-checkout station may also include a microphone, which is either incorporated in the video camera 56 or in the checkstand 18. The microphone generates an audio signal that may be digitized to provide audio data.

Each self-checkout station 110 in the system 100 generates operational data messages and requests for data from the server 104 that are communicated through the hub 108. When a self-checkout station 110 detects an intervention event, an intervention event evaluator of the control application for the self-checkout station generates an intervention event identifier and a time for the event. The control application then determines whether an intervention request is to be generated. This determination may be based on the elapsed time since the intervention event was detected. By calculating the elapsed time and comparing it to a threshold, the control application generates an intervention request when the elapsed time exceeds the threshold. Other criteria may be used to generate an intervention request, such as unavailability of an on-site attendant or the event identifier corresponding to an event that does not require physical interaction with the self-checkout station. Once an intervention request is generated, the control application identifies a destination address for the request that corresponds to the queue manager 116. The high speed hub 112 within a self-checkout station 110 transmits the intervention request to the hub 108 where it is routed over the network 118 to the queue manager 116 at the remote site 114.

The queue manager 114 routes the intervention request to the next available intervention service station 120 at the remote site 114. Once the queue manager assigns an intervention station 120 to an intervention request, the queue manager opens a session between the intervention service station and the self-checkout station that generated the intervention request. Thereafter, messages received from the self-checkout station are routed to the same intervention service station until the session is concluded with resolution of the intervention event.

At an intervention service station 120, a display is generated from the intervention request that identifies the intervention event and the location of the self-checkout station where the event occurred. The station 120, either automatically or through operator interaction, may request video and audio data from the self-checkout station. This data request is communicated through the queue manager 116 over the network 118 and through the hub 108 to the self-checkout station 110 that generated the intervention request. Preferably, the self-checkout station 110 includes a video data buffer for buffering the video data from the camera 56 before writing over the data. This buffer enables the self-checkout station 110 to retain video data of the event as it occurred. Sending the video stream to the intervention service station 120 enables the operator to view the event. These video data and the operational data provided from the self-checkout station assist the operator in assessing the status of the self-checkout station and formulating a course of action for resolving the event.

To address the event, the operator of the intervention service station 120, through a graphic user interface or the like, causes the station to generate checkout station commands for operating the self-checkout station. These commands are transmitted to the self-checkout station for execution. Feedback to the execution of these commands is obtained through the operational data sent from the self-checkout station and/or from the video and audio data generated by the self-checkout station. From these various data, the operator of the intervention service station may determine that the event has been resolved so the communication session with the self-checkout station may be terminated. Should the operator determine that the attention of an on-site attendant is necessary, the operator may signal such an attendant via a pager, a wireless VoIP phone call, a cellular call, a checkout station command to illuminate the red light of the tri-color indicator 54, or the like. The signal may also include the operator's identification of the issue and the action the attendant should take to resolve the event on-site.

To further relieve consumer frustration arising from an intervention event, a video camera and microphone may be provided at the intervention service station. This camera and microphone provide video data of the operator's face and audio data of the operator's voice to give the consumer human interaction. In this manner, the consumer perceives an attendant is working on the event and listening to the consumer's description of the event. This type of interaction reduces the likelihood that the consumer perceives resolution of the event as mindless interaction with a machine. Instead, the consumer senses that someone is available to address the issue that has occurred at a self-checkout station. This sense also contributes to a perceived sense that security at the self-checkout station is vigilant and that the consumer cannot be sure that he or she will be able to perpetrate a fraud of some type at the checkout station without detection.

The network 118 shown in FIG. 2 may be a wide area computer network (WAN) or other communication network. The WAN may be a closed network that only couples self-checkout stations of a retail merchant with the intervention service stations of one or more remote sites. The WAN may also be an open network, such as the Internet, that provides a public communication network. In order to ensure secure communication of data, the data hub 108 and the queue manager 116 may be provided with a data encryption and decryption module. These modules may use known data encryption and decryption methods, such as RSA or other public/private key schemes, to encrypt and decrypt the data communicated between self-checkout stations and intervention service stations.

Figure 4:
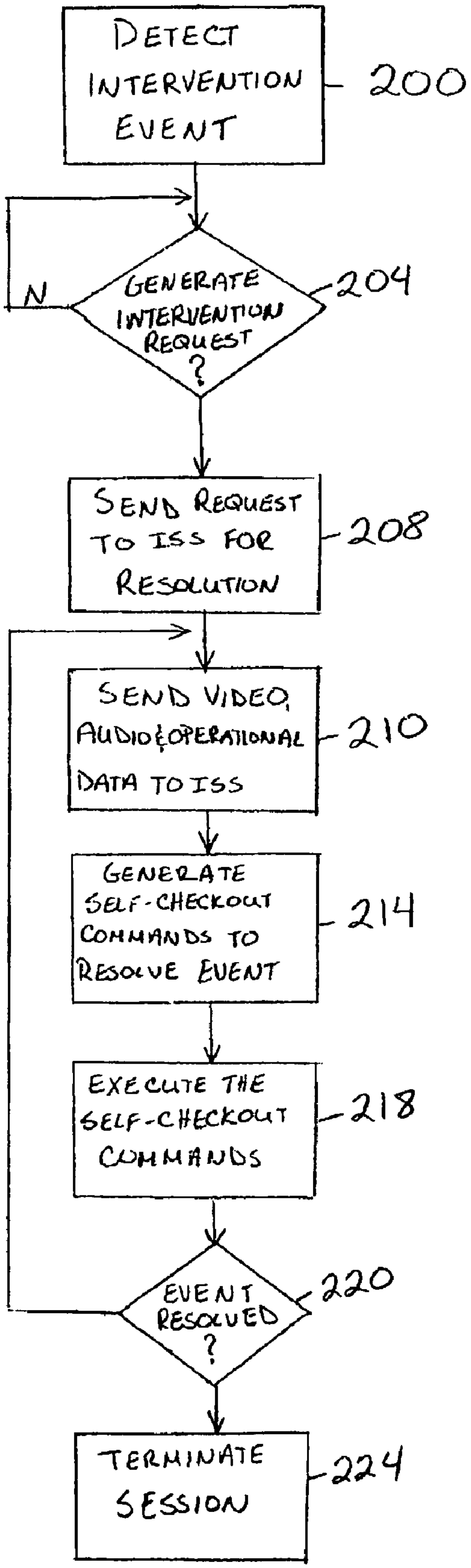
FIG. 4 is a flow diagram of a method that may be implemented by the system in FIG. 2.

A method that may be implemented by the system 100 described above is shown in FIG. 4. The method may begin with the self-checkout station detecting an intervention event (block 200). The control application of the self-checkout station determines whether to generate an intervention request (block 204). If a request is not generated, the application waits until the threshold condition for generating a request is reached. Once a request is generated, it is sent to the intervention service station for resolution (block 208). The self-checkout station also sends operational, video, and audio data to the intervention service station for analysis of the intervention event (block 210). The operator at the intervention service station causes the station to generate and send self-checkout station commands to resolve the event (block 214). The self-checkout station executes the commands received from the intervention service station (block 218). The self-checkout station continues to send video, audio, and operational data to the intervention service station until the operator determines the event has been resolved and no further commands are required (block 220). Once the event is resolved, the communication session between the intervention service station and the self-checkout station is terminated (block 224).

In operation, a plurality of self-checkout, checkout, or remote attendant stations are provided with a control application that generates intervention requests for addressing intervention events at the self-checkout station. The self-checkout stations are coupled to a plurality of intervention service stations through a network. Thereafter, intervention events are evaluated by the control application to determine whether an intervention request is to be generated. Once the intervention request is generated, it is sent to an intervention service station. Video and audio data from the self-checkout station along with operational data generated by the self-checkout station are sent to the intervention service station. These data are used by an operator at the intervention service station to resolve an intervention event or signal an on-site person for resolution of the event. Video and audio data of the operator may also be provided to the self-checkout station to inform the consumer that the event is being addressed by a person.

The system and method described above enhance the resolution of intervention events at self-checkout stations without requiring more self-checkout station attendants at the retail site. In fact, no on-site attendant may be required other than a designated employee for handling on-site attendant signals generated by intervention service stations. The remote attendants may be located at one or more remote sites and the intervention service stations at a remote site may resolve events at self-checkout stations located at different retail sites. In this manner, the monitoring of self-checkout stations may be centralized and a significant cost component for using self-checkout stations reduced or removed from a local retail site's operation.

While the present invention has been illustrated by the description of exemplary processes and system components, and while the various processes and components have been described in considerable detail, applicants do not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for intervening in the operation of a checkout station from a remote location comprising:
- a checkout station located at a retail establishment including a processor, a plurality of peripherals, and a first hub coupling the processor to the plurality of peripherals;
- a video camera and microphone mounted at the checkout station;
- a second hub for collecting video and audio data from the video camera and the microphone, and for collecting operational data from the processor and the plurality of peripherals through the first hub; and
- an intervention service station for receiving the video data, the audio data, and the operational data from the second hub, the intervention service station being located off-site from the retail establishment and connected to the second hub via a wide area network;
- wherein the intervention service station includes a checkout station command generator for generating and sending checkout station commands to the processor through the wide area network, the first hub, and the second hub in response to the operational data received from the second hub so that an operator at the intervention service station can intervene in checkout station operation.

2. The system of claim 1, the checkout station further comprising:
- a remote intervention evaluator for detecting an intervention event, for assigning an even identifier to the intervention event, for capturing a time of the intervention event, and for determining whether the second hub sends the video data, the audio data, and the operational data to the intervention service station.

3. The system of claim 2, the checkout station further comprising:
- an intervention event request generator for generating the intervention request;
- wherein the remote intervention evaluator is also for calculating an elapsed time from the time of the intervention event to determine whether the second hub sends the video data, the audio data, and the operational data to the intervention service station.

4. The system of claim 2 further comprising:
- a plurality of additional intervention service stations located off-site from the retail establishment and connected to the second hub via the wide area network; and
- an intervention queue manager coupled between all of the intervention service stations and the checkout station for determining which intervention service station out of all of the intervention service stations receives the intervention request and for connecting a determined intervention service station to the processor through the wide area network, the second hub, and the first hub.

5. The system of claim 4 further comprising:

a plurality of additional checkout stations located at multiple retail establishments, the plurality of additional checkout stations being coupled to the second hub so that an intervention request from a checkout station in the plurality of additional checkout stations is received through the second hub by one of the intervention service stations.

6. The system of claim 1, wherein the second hub and the intervention service station each comprise:

a data encryption and decryption module for securing the video data, the audio data, and the operational data for communication.

7. The system of claim 1, wherein the intervention service station further comprises:

a video camera and a microphone for generating intervention service station video data and intervention service station audio data of the operator for transmission to the checkout station through the second hub;

the intervention service station video data and the intervention service station audio data being sent to the checkout station with the generated checkout station commands.

8. A method for intervening in the operation of a checkout station from a remote location comprising:

generating video data by a video camera at the checkout station;

generating audio data by a microphone mounted at the checkout station;

generating operational data by a processor and a plurality of peripherals at the checkout station;

transmitting the video data, the audio data, and the operational data from the checkout station to a first hub, including transmitting at least the operational data through a second hub at the checkout station by the processor and the plurality of peripherals;

receiving the video data, the audio data, and the operational data from the first hub over a wide area network by an intervention service station that is located offsite from the retail establishment; and generating and sending checkout station commands to the processor over the wide area network via the second hub and the first hub in response to the operational data received from the checkout station so that an operator at the intervention service station can intervene in checkout station operation.

9. The method of claim 8 further comprising:

determining an intervention event has occurred at the checkout station by the processor.

10. The method of claim 9 further comprising:

generating an intervention event identifier with a time of event by the processor; and calculating an elapsed time from the time of event to determine whether to generate an intervention request by the processor.

11. The method of claim 8 further comprising:

determining which intervention service station in a plurality of intervention service stations located off-site from the retail establishment, including the one intervention service station, receives an intervention request from the checkout station.

12. The method of claim 11 further comprising:

coupling a plurality of additional checkout stations located at multiple retail establishments to all of the intervention service stations so that an intervention request from the one checkout station or any of the plurality of checkout stations is received through the network data hub by one of the plurality of intervention service stations.

13. The method of claim 8 further comprising:

encrypting and decrypting the video data, the audio data, and the operational data.

14. The method of claim 8 further comprising:

generating video data and audio data of the operator of the intervention service station for transmission to the checkout station; and transmitting the video and audio data of the operator with the generated checkout station commands.

15. A system for intervening in the operation of a checkout station from a remote location comprising:

an intervention service station for receiving video data from a camera a checkout station located at a retail establishment and audio data from a microphone at the checkout station through a first hub, for receiving operational data from a processor and a plurality of peripherals of the checkout station through a second hub and the first hub, the intervention service station being located off-site from the retail establishment and connected to the first hub via a wide area network;

wherein the intervention service station includes a checkout station command generator for generating and sending checkout station commands to a processor of the checkout station through the wide area network, the first hub, and a second hub at the checkout station in response to the operational data received from the first hub so that an operator at the intervention service station can intervene in the checkout station operation.

16. A method of intervening in the operation of a checkout station from a remote location comprising:

receiving video data from a video camera at a checkout station located at a retail establishment and audio data from a microphone at the checkout station through a first hub coupled to a wide area network;

receiving operational data by a processor and a plurality of peripherals at the checkout station through a second hub and a first hub at the checkout station by an intervention service station that is located off-site from the retail establishment; and generating and sending checkout station commands to the processor over the wide area network via the second hub and the first hub in response to the operational data received from the checkout station so that an operator at the intervention service station can intervene in checkout station operation.

17. A self-checkout station comprising:

a checkstand including a consumer terminal and a plurality of peripherals including an item identifier, a scale, a payment terminal, and a receipt printer, wherein the checkstand is located at a retail establishment;

a video camera and microphone mounted at the checkstand;

a first hub at the checkout station for collecting operational data from the consumer terminal and the plurality of peripherals;

a second hub for collecting video data from the video camera and audio data from the microphone, and operational data from the first hub;

wherein the checkstand sends the video data, the audio data, and the operational data through the second hub to an intervention service station located off-site from the retail establishment and connected to the second hub via a wide area network; and wherein the consumer terminal receives checkout station commands from the intervention service station through the second hub and the first hub so that an operator at the intervention service station can intervene in checkstand operation.

18. A method of controlling a checkout station from a remote location comprising:

generating video data by a video camera at the checkout station;

generating audio data by a microphone mounted at the checkout station;

generating operational data by a processor and a plurality of peripherals at the checkout station;

transmitting the video data and the audio data from the checkout station to an intervention service station located offsite from the retail establishment through a first hub and a wide area network between the first hub and the intervention service station;

transmitting the operational data to the intervention service station through a second hub at the checkout station, the first hub, and the wide area network;

receiving checkout station commands by the processor over the wide area network and through the first hub and the second hub so that an operator at the intervention service station can intervene in checkout station operation.

19. A system for intervening in the operation of a checkout station from a remote location comprising:

a plurality of checkout stations located at a retail establishment, each including a processor, a plurality of peripherals, and a first hub coupling the processor to the plurality of peripherals;

wherein one of the processors in one of the plurality of checkout stations generates an intervention request;

a video camera and microphone mounted at each of the plurality of checkout stations;

a second hub coupled to each of the plurality of checkout stations for collecting video and audio data from the video camera and the microphone, and for collecting operational data from the processor and the plurality of peripherals through the first hub;

a plurality of intervention service stations located off-site from the retail establishment and coupled to the second hub through a wide area network; and an intervention queue manager coupled between the plurality of intervention service stations and the second hub for determining which intervention service station in the plurality of intervention service stations receives the intervention request;

wherein a determined intervention service station is for receiving the video data, the audio data, and the operational data from the one checkout station through the second hub;

wherein each of the plurality of intervention service stations includes a checkout station command generator for generating and sending checkout station commands to the processor through the wide area network and the first hub in response to the operational data received from the second hub so that an operator at the intervention service station can intervene in checkout station operation.

20. A method for intervening in the operation of a checkout station from a remote location comprising:

generating video data by a video camera at each of a plurality of checkout stations;

generating audio data by a microphone mounted at each of a plurality of checkout stations;

generating operational data by a processor and a plurality of peripherals at each of a plurality of checkout stations;

transmitting the video data, the audio data, and the operational data from each of the plurality of checkout stations to a first hub, including transmitting at least the operational data through a second hub at each of the plurality of checkout stations by the processor and the plurality of peripherals at each of the plurality of checkout stations;

determining which intervention service station in a plurality of intervention service stations located off-site from the retail establishment receives an intervention request from one of the checkout stations by a server;

receiving the video data, the audio data, and the operational data of the one checkout station from the first hub over a wide area network by a determined intervention service station; and generating and sending checkout station commands to the processor of the one checkout station over the wide area network via the second hub and the first hub in response to the operational data received from the one checkout station so that an operator at the determined intervention service station can intervene in checkout station operation.

* * * * *